July 9, 1968  A. HAMMERSTEIN  3,392,278
LIGHTING ARRANGEMENT FOR AUTOMOTIVE VEHICLES
Filed March 17, 1966
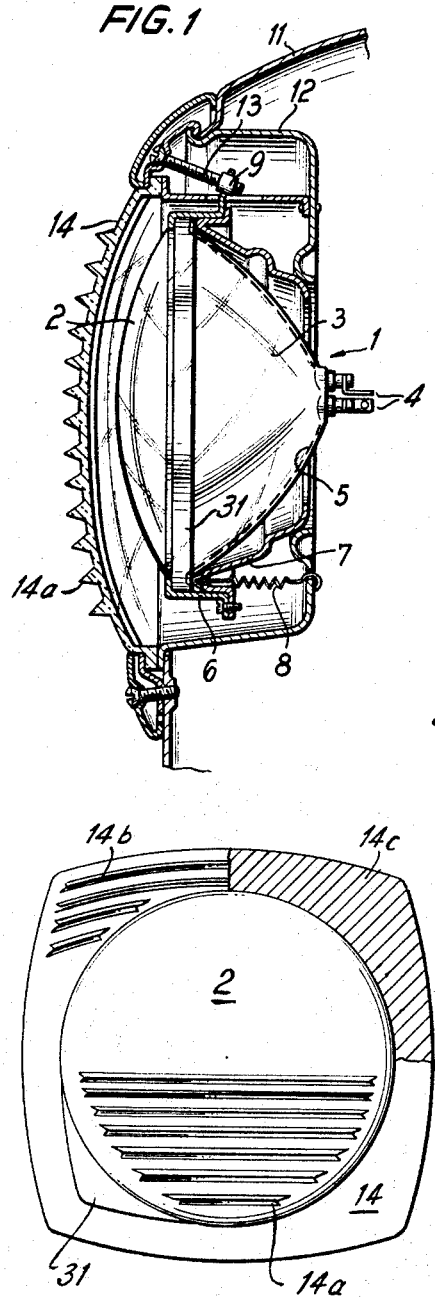
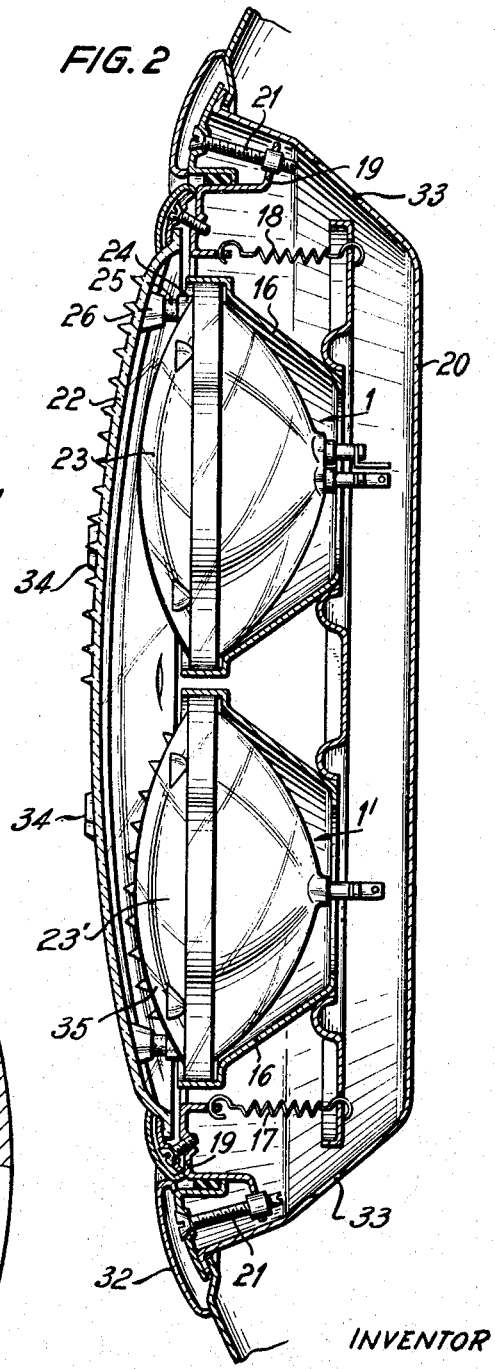
INVENTOR
ALBERT HAMMERSTEIN

United States Patent Office 3,392,278
Patented July 9, 1968

3,392,278
LIGHTING ARRANGEMENT FOR
AUTOMOTIVE VEHICLES
Albert Hammerstein, Stuttgart-Sonnenberg, Germany, assignor to Robert Bosch G.m.b.H., Stuttgart, Germany, a limited-liability company of Germany
Filed Mar. 17, 1966, Ser. No. 535,068
Claims priority, application Germany, Mar. 25, 1965, B 81,158
2 Claims. (Cl. 240—41.4)

ABSTRACT OF THE DISCLOSURE

A pair of lenses are provided, one in front of the other; the outer one has a squared-off aspect and one, only, of the two lenses is ribbed while the other is smooth in the region of light transmission of the beam, to provide proper direction of throw of the beam and still present a squared-off appearance.

---

The present invention relates to a lighting arrangement for automotive vehicles, and more particularly to an arrangement in which a light assembly is covered by a transparent covering lens, which has a visual aspect which is not round, for example essentially square.

Automotive headlight assemblies, which may be combined with direction signals and parking lights, usually include a headlight which is round. Such a round headlight may be a sealed beam unit in which the incandescent filament is sealed together with the reflector of the headlight; or may consist of units in which the incandescent filament is removably sealed into the reflector, or in which a separate headlight is inserted into a reflector member, closed off by a cover glass or lens. The cover glass or lens can be permanently assembled to the reflector, or can be removably mounted.

Automobile headlight assemblies have been proposed having a light distribution lens which are not round. Use of such light distribution lenses in combination with sealed beam headlights, or other round headlights of the type referred to, cause difficulties, since sealed beam headlights cannot readily be made in a form other than round.

It is an object of the present invention to provide a headlight arrangement for automotive vehicles in which the front aspect of the headlight assembly is not round, for example squared-off, and which still permits the use of sealed beam or similar light units.

A cover plate, or lens, is placed in front of a sealed beam, or similar unit, and having the desired shape and aspect. Briefly, according to the invention, the lens provided by either the sealed beam unit, or the cover, is smooth and clear; only one of the two lenses have, in the region traversed by the light beam, the usual light distribution ribs.

The structure, organization and operation of the invention will now be described more specifically in the following detailed description with reference to the accompanying drawings, in which:

FIG. 1 is a vertical sectional view through a single headlight having a sealed beam unit;

FIG. 2 is a vertical sectional view through a dual headlight assembly, having a pair of vertically arranged sealed-in beam units; and FIG. 3 is a front view of the aspect of a single headlight unit.

Referring now to the drawings, and in particular to FIG. 1: A sealed beam headlight unit 1 has a glass lens 2, joined to a glass reflector body 3 having an internal reflecting layer 5, and electrical connections 4 for the filament. The sealed beam unit, or assembly, is secured to vehicle body 11 within a headlight housing 12 by the customary headlight holding assembly consisting of clamps and springs shown at 6, 7, 8, 9. Adjustment screw 13 is provided to adjust the direction of the headlight beam. This adjustment is independent of the mounting of lens 14.

A cover plate, or lens 14, having an outline or front aspect which is not round but essentially square (FIG. 3) is placed in front of the lens 2. In accordance with the present invention, glass lens 2 is smooth and the outer cover plate, or lens 14 is provided with ribs as schematically shown at 14a. It is of course possible to reverse the arrangement of providing diffusion ribs; the ribs may be arranged on the glass cover 2 of the sealed beam unit, and the lens 14 may be smooth, at least within the region of passage of the light beam coming from sealed beam unit 1; lens 14 may have ribs, or grooves 14b which may be primarily intended for decorative aspect, at the edges, and at the peripheral regions not directly passed by the light beam from sealed beam unit 1.

In order to still change the visual aspect of the headlight assembly, the sealed beam unit 1 may be provided with lateral extensions generally covering the squared-off outer marginal portions of the headlight assembly as shown in one corner at 31, FIG. 1. The cover lens 14, instead of having ribs in the region where the light is not transmitted directly, may be smooth; or reflecting, or opaque (14c, FIG. 3).

A multiple headlight assembly is shown in FIG. 2; assemblies 1, 1' are provided, above each other. One assembly may be utilized as a headlight high beam and the other as the headlight low beam; or one may be a multiple beam headlight and the other may be arranged as a parking and turn indicator light. Again, the customary holding arrangement comprising parts 16, 17, 18, 19 to clamp and resiliently hold the assembly to a vehicle are provided. A lamp housing 20 protects the back of the light assemblies, which may be adjusted by screws 21, shown offset in FIG. 2. Screws 21 are accessible from the front of the vehicle by removal of the customary decorative snap ring 32; it is also desirable to provide access to the screws from the interior of the vehicle, for example by providing suitably aligned holes 33 in lamp housing 20 and an additional screw driver slot at the end of the screw 21. The arrangement according to FIG. 2 provides for adjustment of the cover plate or lens 22 jointly with adjustment of the sealed beam units 1, 1'. Lens 23 is provided with small, outwardly projecting bosses 24. Plastic spacer members 25, which may have a little, but not much resiliency, separate the lens 23 from similarly located inwardly directed bosses 26 arranged internally of cover lens 22. In the embodiment shown, the top portion of cover plate 22 is provided with light directing ribs, and the lens 23 of unit 1 is then, in accordance with the invention, smooth. The outside of lens 22 is provided with locating projections 34 to facilitate joint adjustment of lens 22 and units 1, 1'.

The lens arrangement in front of sealed beam unit 1' shows an alternative arrangement, in which the lens 23' of the sealed beam unit is formed with light directing ribs 35, whereas the lower portion of the cover plate and lens 22 is clear and smooth in those regions where the light beam coming from unit 1' passes therethrough. The sides and the region not traversed by the light beam may, as above referred to, be opaque, reflecting, or provided with decorative ribs or embossings.

I claim:
1. Headlight arrangement for automotive vehicles comprising
an assembly of a light source, a reflector, and a transparent lens;

an outside cover lens extending over said assembly;

only one of said lenses, within the region of the light-beam generated by said assembly being smooth and the other of said lenses, within the region of said light beam generated by assembly then being formed with ribbing, the outside cover lens having a generally squared-off frontal aspect and being formed with a central, substantially circular region for direct passage of the light beam therethrough, and laterally projecting flanges forming marginal side regions and providing said squared-off frontal aspect;

and projecting means arranged on said lenses directed towards, and bearing against each other to securely locate said lenses with respect to each other.

2. Headlight arrangement according to claim 1, wherein said light source comprises two separate lamp assemblies, one lamp assembly being a head light assembly and the other a parking-turn signal light assembly.

References Cited

UNITED STATES PATENTS

| | | | |
|---|---|---|---|
| 1,233,495 | 7/1917 | Muckenhirn | 240—45.59 |
| 1,276,924 | 8/1918 | Hunt | 240—41.4 |
| 1,436,655 | 11/1922 | Halvorson | 240—41.6 |
| 1,676,464 | 7/1928 | Ryan | 240—41.4 |
| 1,751,070 | 3/1930 | Boots et al. | 240—41.35 |
| 1,895,906 | 1/1933 | Arbuckle | 240—41.6 |
| 2,043,567 | 6/1936 | Worden | 240—41.5 |
| 2,138,079 | 11/1938 | Taylor et al. | 240—41.5 |
| 2,278,028 | 3/1942 | Thoen | 240—41.5 |
| 2,870,362 | 1/1959 | Arnold et al. | 240—41 |
| 2,907,249 | 10/1959 | Hjermstad | 240—41.4 |
| 3,167,256 | 1/1965 | Elliott | 240—46.59 |

NORTON ANSHER, *Primary Examiner.*

J. W. PRICE, *Assistant Examiner.*